(12) United States Patent
Schrag et al.

(10) Patent No.: US 9,913,432 B2
(45) Date of Patent: Mar. 13, 2018

(54) SQUARE BALER PROVIDING SIDE-TO-SIDE BALE UNIFORMITY

(71) Applicant: AGCO Corporation, Hesston, KS (US)

(72) Inventors: Thomas G. Schrag, Hesston, KS (US); Larry D. Retzlaff, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 15/533,199

(22) PCT Filed: Dec. 14, 2015

(86) PCT No.: PCT/US2015/065593
§ 371 (c)(1),
(2) Date: Jun. 5, 2017

(87) PCT Pub. No.: WO2016/100223
PCT Pub. Date: Jun. 23, 2016

(65) Prior Publication Data
US 2017/0367267 A1    Dec. 28, 2017

Related U.S. Application Data

(60) Provisional application No. 62/093,875, filed on Dec. 18, 2014.

(51) Int. Cl.
*A01F 15/08* (2006.01)
*B30B 9/30* (2006.01)

(52) U.S. Cl.
CPC ........ *A01F 15/0825* (2013.01); *B30B 9/3007* (2013.01); *B30B 9/3025* (2013.01)

(58) Field of Classification Search
CPC ............ A01F 15/0825; A01F 2015/102; A01F 15/101; A01F 15/042; B30B 9/3007; B30B 9/3025

(Continued)

(56) References Cited

U.S. PATENT DOCUMENTS 2,823,603 A * 2/1958 Collins ............... A01F 15/0825
100/179
3,424,081 A * 1/1969 Hoke .................. A01F 15/0825
100/192

(Continued)

FOREIGN PATENT DOCUMENTS

EP 0257614 A1 3/1988
EP 0908089 A1 4/1999

(Continued)

OTHER PUBLICATIONS

UK Intellectual Property Ofice, International Search Report for Related UK Application No. GB1500155.5, dated Jun. 29, 2015.

(Continued)

*Primary Examiner* — Jimmy T Nguyen

(57) ABSTRACT

A baling system for baling crop material includes a baling chamber. Moveable doors partly define the chamber and the shape of the bale. Hydraulic tension cylinders extend and retract to apply a force to the moveable doors and the growing bale, and transducers measure the lengths of the tension cylinders. An electronic control unit receives the lengths from the transducers, and communicates via a display at least a relative difference between the lengths for consideration in steering the baling system. In particular, the lengths being equal indicates the growing bale is substantially straight and the baling system should be steered straight, and the lengths being unequal indicates the growing bale is developing a curvature and the baling system should be steered in the direction of the cylinder having the shorter length. The transducers may be located external or internal to the cylinders, and may measure the lengths continuously or periodically.

12 Claims, 12 Drawing Sheets

(58) Field of Classification Search
USPC .............................. 100/179, 188 R, 191, 192
See application file for complete search history.

(56) References Cited

U.S. PATENT DOCUMENTS

| | | |
|---|---|---|
| 4,037,528 A | 7/1977 | White et al. |
| 5,226,356 A | 7/1993 | Schrag et al. |
| 5,819,643 A | 10/1998 | McIlwain et al. |
| 7,975,607 B2 * | 7/2011 | Hoover ............... A01F 15/0825 100/191 |
| 2013/0312381 A1 * | 11/2013 | Lang .................. A01F 15/0825 56/14.7 |
| 2014/0090568 A1 * | 4/2014 | Missotten ............... A01F 15/08 100/346 |
| 2015/0272006 A1 * | 10/2015 | Demon ............... A01F 15/0825 700/275 |

FOREIGN PATENT DOCUMENTS

| | | |
|---|---|---|
| EP | 2666351 A1 | 11/2013 |
| WO | 2013/178632 A1 | 12/2013 |
| WO | 2014/076271 A1 | 5/2014 |

OTHER PUBLICATIONS

European Patent Office, International Search Report for parent International Application No. PCT/US2015/065593, dated Mar. 16, 2016.

* cited by examiner

SQUARE BALER PROVIDING SIDE-TO-SIDE BALE UNIFORMITY

RELATED APPLICATION

Under provisions of 35 U.S.C. § 119(e), Applicants claim the benefit of U.S. Provisional Application No. 62/093,875, entitled SQUARE BALER PROVIDING SIDE-TO-SIDE BALE UNIFORMITY and filed Dec. 18, 2014, which is incorporated herein by reference.

BACKGROUND

Field of the Invention

The present invention relates to systems and methods for controlling the operation of balers.

Description of Related Art

Large square balers are used in the agricultural industry to create large substantially rectangular bales of crop material by moving over crop windrows to collect loose crop material, compress it, and form it into bales that are then tied and ejected. To that end, a baler is typically mechanically coupled with a tractor, and a power take-off (PTO) mechanism transfers power from the tractor's engine to drive the baler's operation. A rotary pick-up at the front of the baler picks up the loose crop material and moves it into a stuffer chamber. Once the stuffer chamber is full, its content, which may be referred to as a "charge", is moved through a stuffer chute into a baling chamber. A reciprocating plunger compresses the charge of crop material into a growing bale. Once the bale reaches a predetermined length, which could be eight feet, it is tied and ejected through a discharge outlet to fall onto the ground behind the baler. The process continues to create the next bale.

However, crop windrows are not always perfectly uniform across their widths, so charges with volumes that are uneven from one side to the other are sometimes fed into the baling chamber. Furthermore, even when the crop windrows are substantially uniform, operators sometimes deviate from perfect positioning over them, which can also result in the charges having uneven densities. When uneven charges are incorporated into growing bales, components of the baling system can experience uneven stresses, and the finished bales may be curved or otherwise misshapen which can adversely affect securing them with twine and subsequently handling and stacking them. Without some form of feedback, there is no practical way for an operator to know of the problem until the finished misshapen bale exits the baler, at which point it is too late to correct the problem.

U.S. Pat. No. 5,226,356 describes a means of identifying when uneven loading is occurring and notifying the operator so he can steer the baler in such a way as to compensate for the unevenness and thereby minimize the problems associated with charges having uneven densities. This is accomplished by using transducers to monitor the compressive loadings at spaced-apart locations on the reciprocating plunger during the compressive stroke, and attributing differential loadings to uneven charges. When the loadings differ from one another by a predetermined amount, the operator is notified so he can take corrective action. This notification takes the form of lighting either a left arrow or a right arrow on a display in order to tell the operator which direction he should steer to make the charges more uniform and thereby correct the load imbalance. Unfortunately, bales may still be produced with significant side-to-side curvature. For some operators, the arrows may seem to be either too sensitive or not sensitive enough, and if the operator does not continuously follow the arrows then the loadings on the reciprocating plunger may equalize and provide incorrect information regarding the shape of the bale.

This background discussion is intended to provide information related to the present invention which is not necessarily prior art.

SUMMARY

Embodiments of the present invention solve the above-described and other problems and limitations by providing for the improved production of bales that have increased side-to-side uniformity and are therefore easier to secure, handle, and stack, while decreasing potentially uneven stresses on baling chamber components.

In an embodiment of the invention, a baling system may be configured to move over, collect, and bale a crop material, wherein a baling chamber receives a charge of crop material and contains a growing bale, and a plunger moves within the baling chamber in a reciprocating manner so as to compact the charge of crop material into the growing bale, and the baling system may comprise left and right moveable doors, left and right tension cylinders, left and right transducers, and an electronic control unit. The left and right moveable doors may at least partly define a shape and dimension of the baling chamber and a shape and dimension of the growing bale. The left and right tension cylinders may be configured to extend and retract in order to apply a force to the left and right moveable doors as the charge of crop material is compacted into the growing bale. The left and right transducers may be configured to measure a first length of the left tension cylinder and a second length of the right tension cylinder. The electronic control unit may be configured to receive the first and second lengths from the left and right transducers, and to communicate at least a relative difference between the first and second lengths for use in steering the baling system. In particular, the first and second lengths being equal may indicate the growing bale is substantially straight and the baling system should be steered straight, and the first and second lengths being unequal may indicate the growing bale is developing a curvature and the baling system should be steered in the direction of the left or right tension cylinder having a shorter length.

In various implementations of this embodiment, the baling system may further include any one or more of the following additional features. The left and right transducers may be located external or internal to the left and right tension cylinders, and may measure the first and second lengths periodically or continuously. The baling system may further include an electronic display configured to receive the first and second lengths from the electronic control unit, and to display the relative difference between the first and second lengths for consideration by an operator of the baling system when steering the baling system. The electronic display may display the relative difference between the first and second lengths in graphical form. The baling system may further include a steering system for substantially automatically steering the baling system based on the relative difference between the first and second lengths. The baling system may further include an upper lever arm and a lower lever arm extending between each of the left and right tension cylinders and the respective left and moveable right doors and configured to apply the force to the respective left and right moveable doors.

Additionally, each of these implementations and embodiments may be alternatively characterized as methods based on their functionalities.

This summary is not intended to identify essential features of the present invention, and is not intended to be used to limit the scope of the claims. These and other aspects of the present invention are described below in greater detail.

DRAWINGS

Embodiments of the present invention are described in detail below with reference to the attached drawing figures, wherein.

The figures are not intended to limit the present invention to the specific embodiments they depict. The drawings are not necessarily to scale.

DETAILED DESCRIPTION

The following detailed description of embodiments of the invention references the accompanying figures. The embodiments are intended to describe aspects of the invention in sufficient detail to enable those with ordinary skill in the art to practice the invention. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment", "an embodiment", or "embodiments" mean that the feature or features referred to are included in at least one embodiment of the invention. Separate references to "one embodiment", "an embodiment", or "embodiments" in this description do not necessarily refer to the same embodiment and are not mutually exclusive unless so stated. Specifically, a feature, structure, act, etc. described in one embodiment may also be included in other embodiments, but is not necessarily included. Thus, particular implementations of the present invention can include a variety of combinations and/or integrations of the embodiments described herein.

Figure 1:
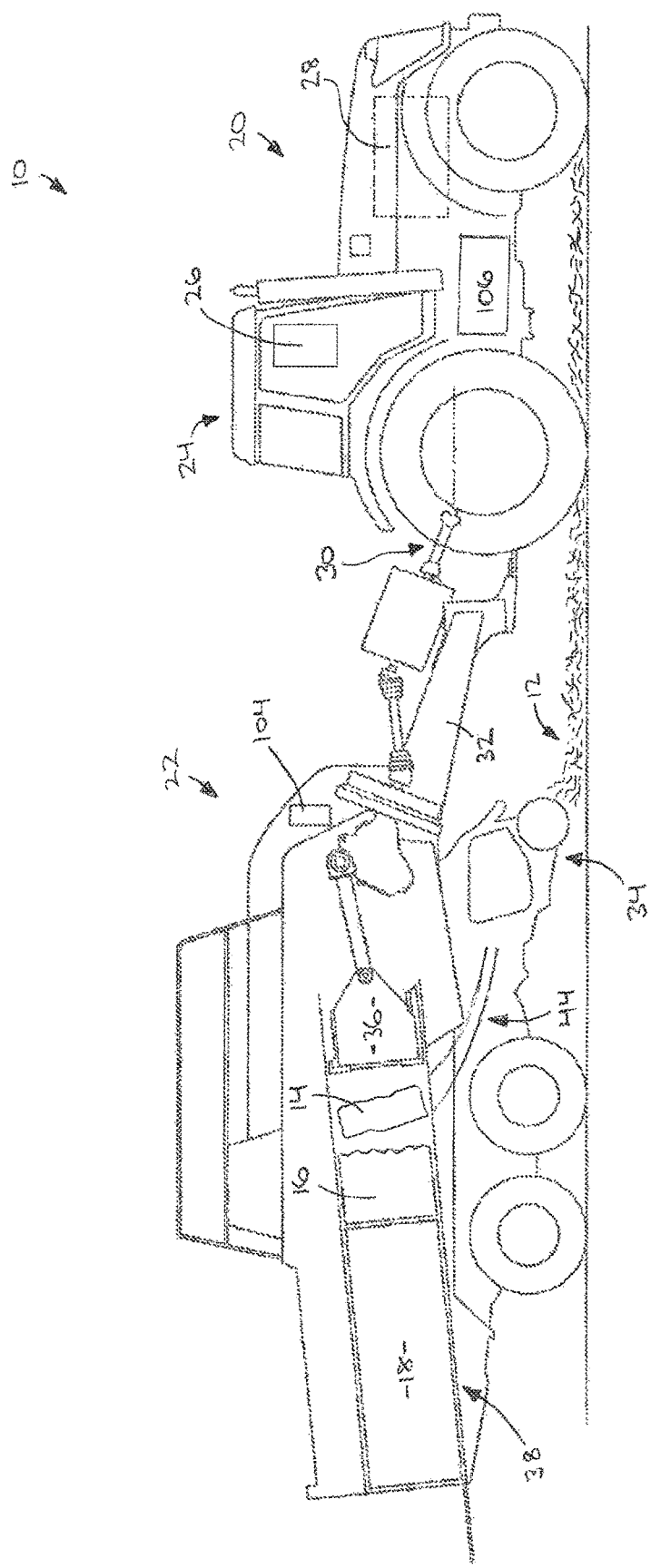
FIG. 1 is a cross-sectional elevation view of a baling system constructed in accordance with an embodiment of the present invention.
Figure 2:
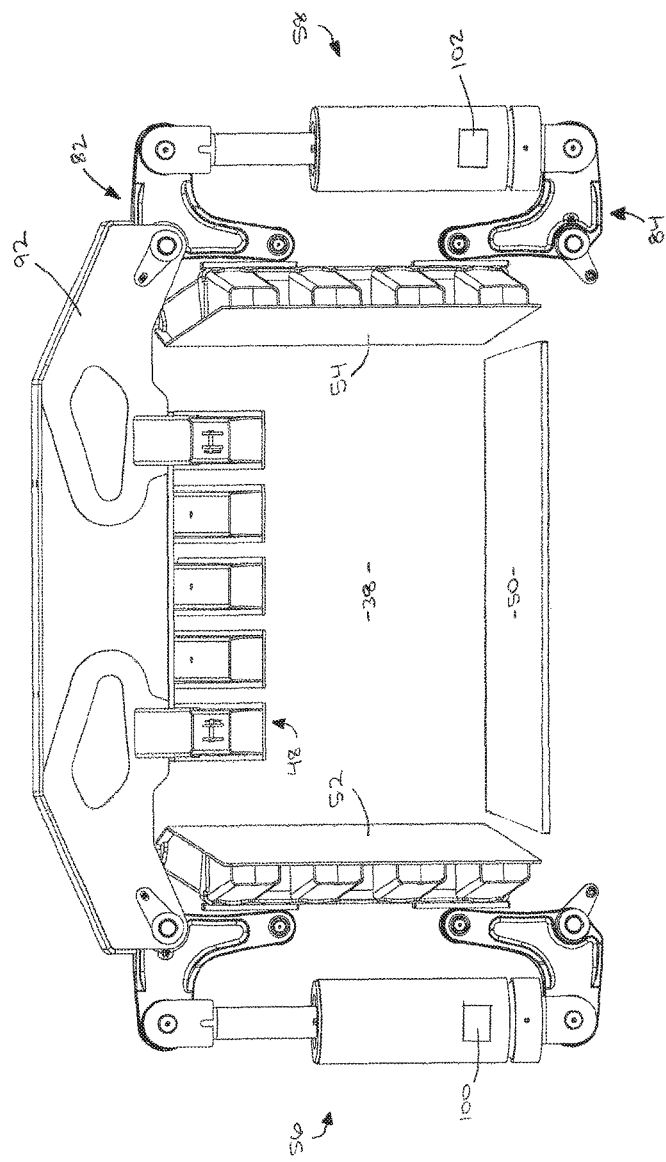
FIG. 2 is a rear elevation view of components of a baling chamber portion of the baling system of FIG. 1.
Figure 3:
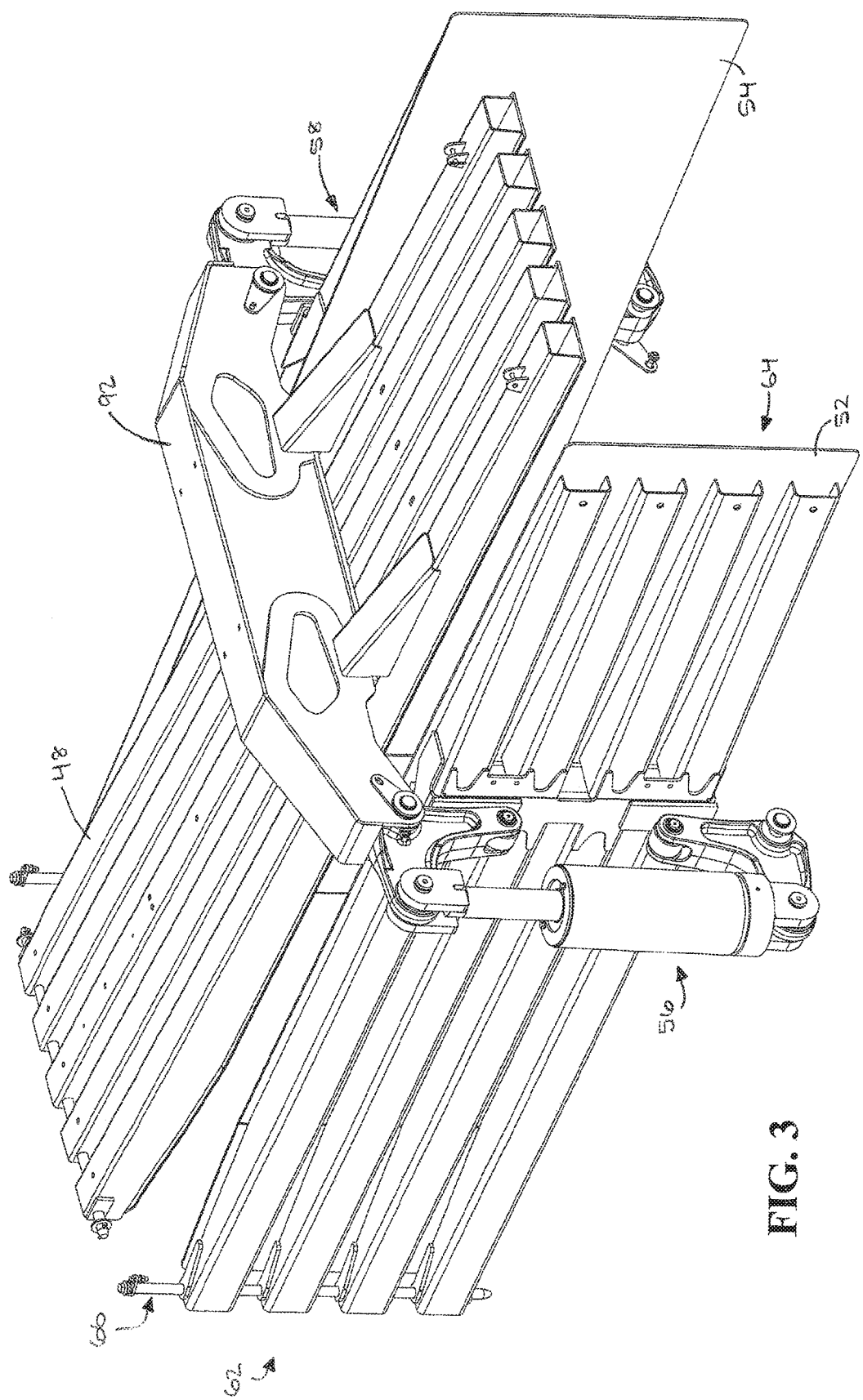
FIG. 3 is an upper left isometric view of the baling chamber components of FIG. 2.
Figure 4:
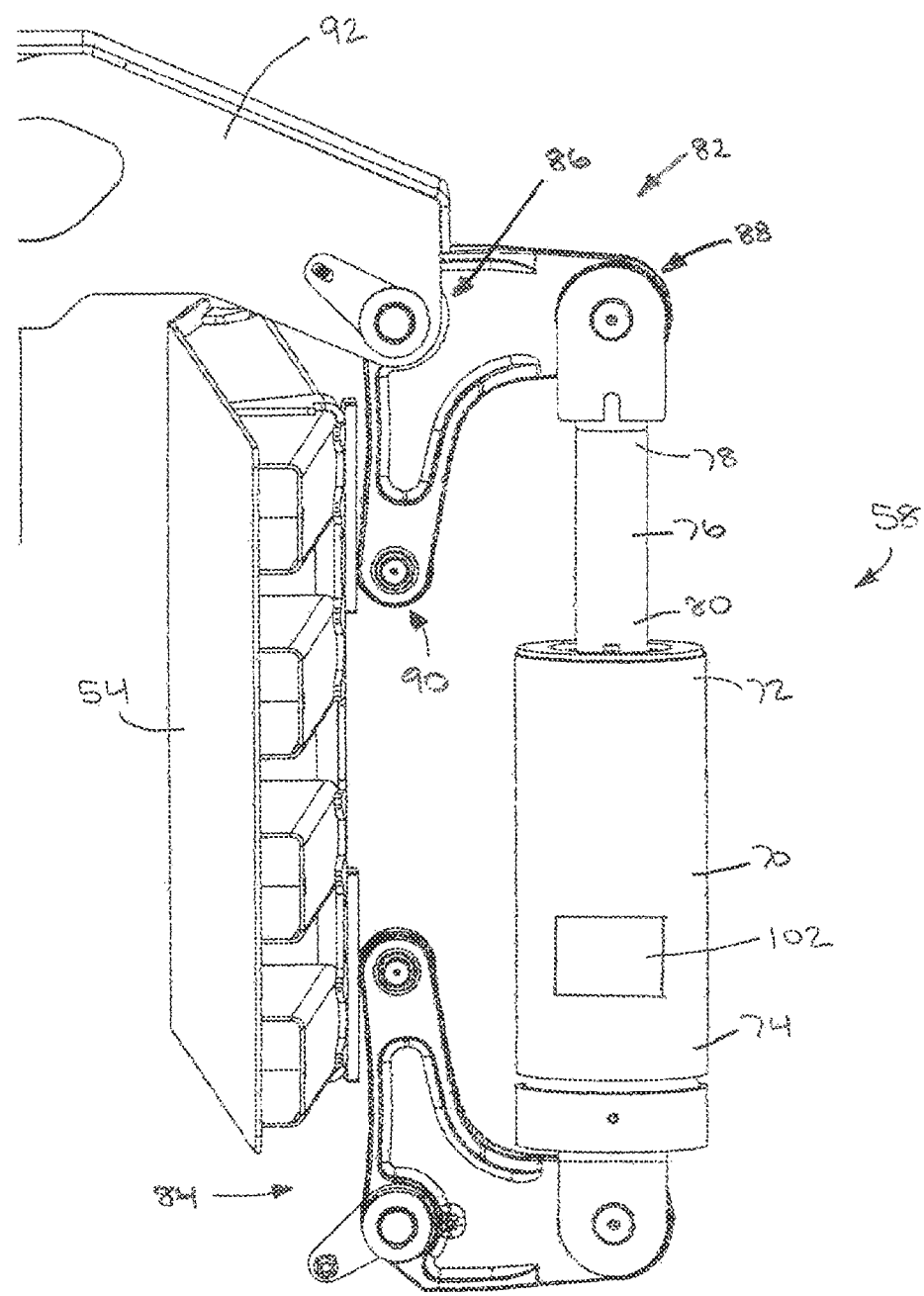
FIG. 4 is a fragmentary rear elevation view of a right tension cylinder component of the baling chamber components of FIG. 2.
Figure 5:
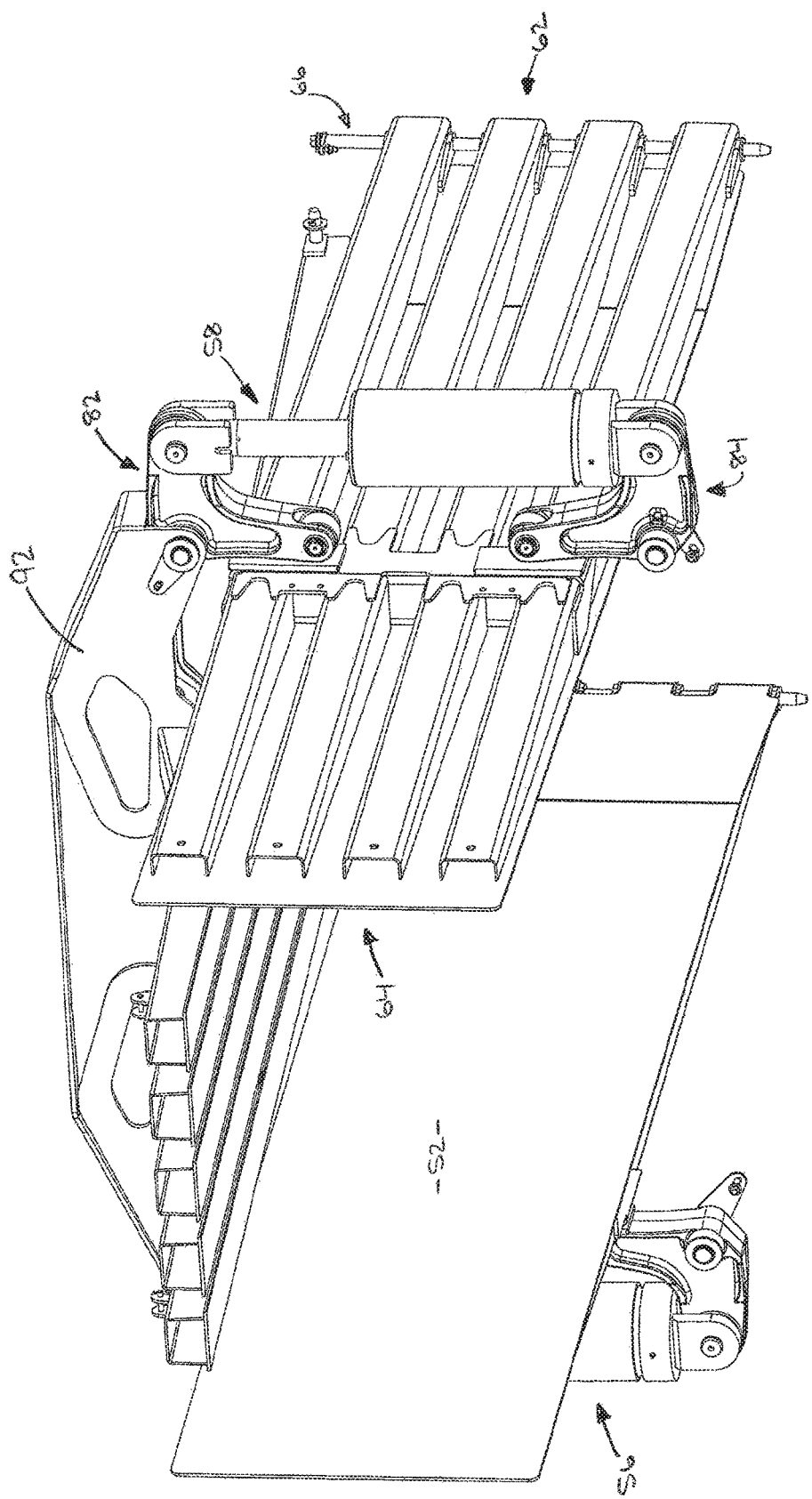
FIG. 5 is a lower right isometric view of the baling chamber components of FIG. 2.
Figure 6:
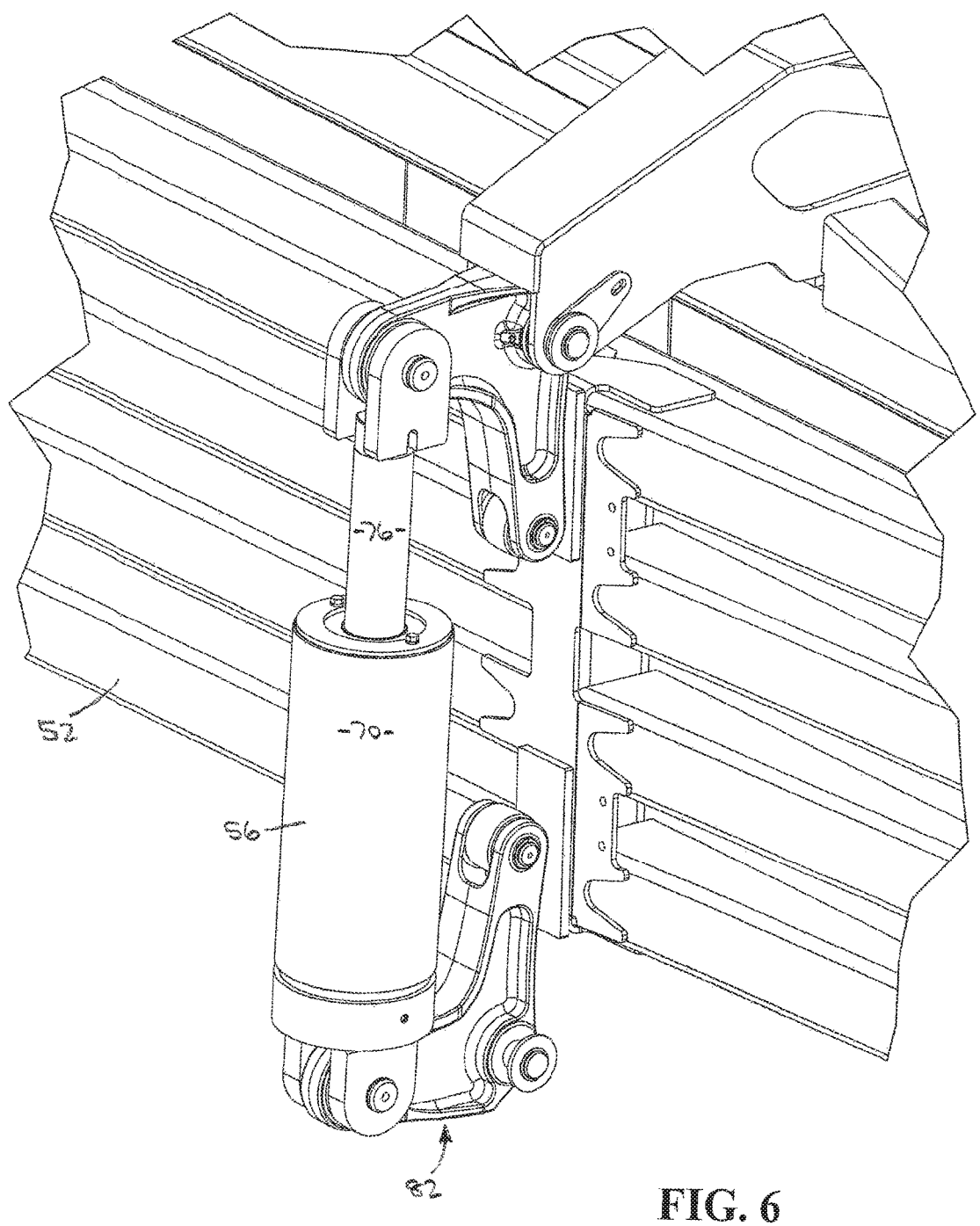
FIG. 6 is a fragmentary upper left isometric view of the baling chamber components of FIG. 2.
Figure 7:
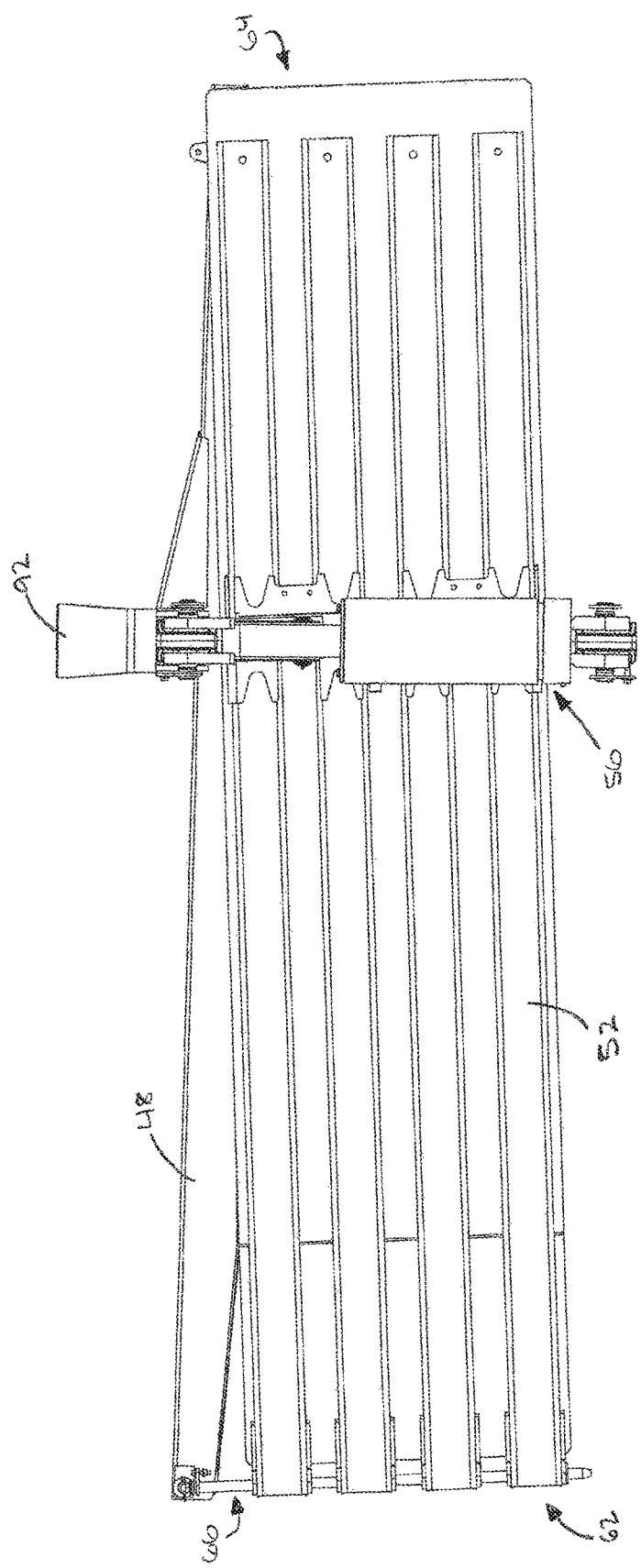
FIG. 7 is a left side elevation view of the baling chamber components of FIG. 2.
Figure 8:
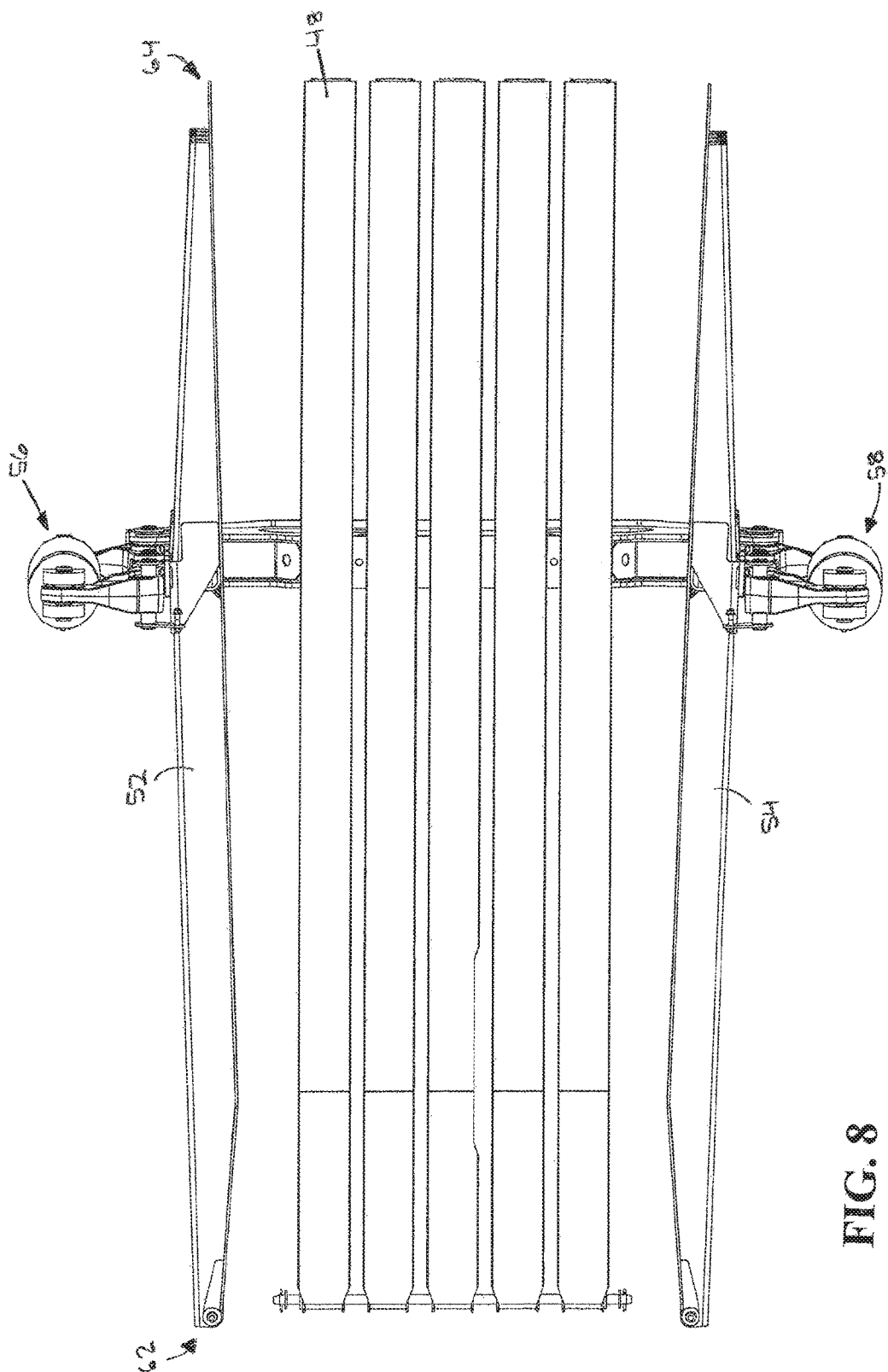
FIG. 8 is a bottom view of the baling chamber components of FIG. 2.
Figure 9:
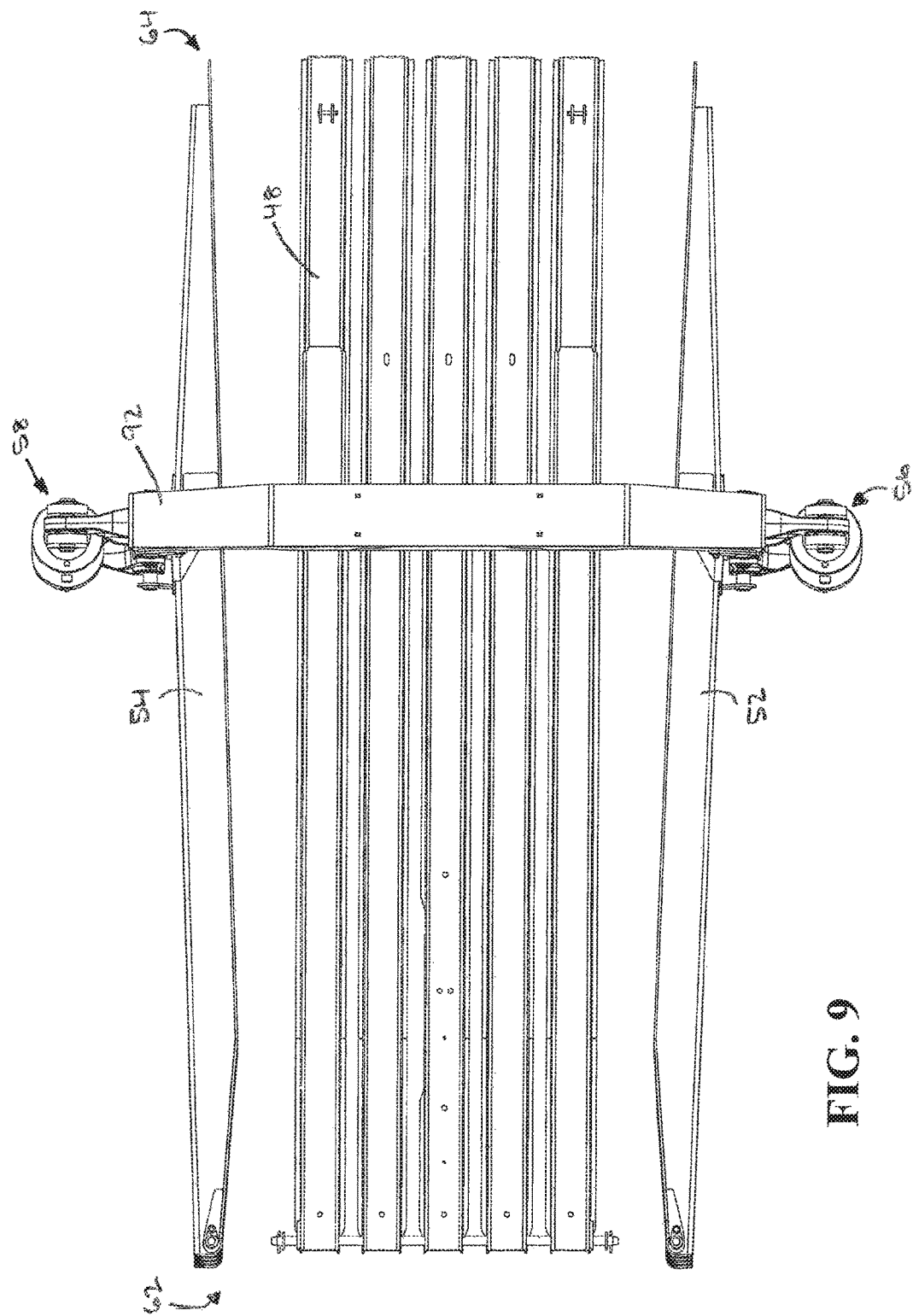
FIG. 9 is a plan view of the baling chamber components of FIG. 2.
Figure 10:
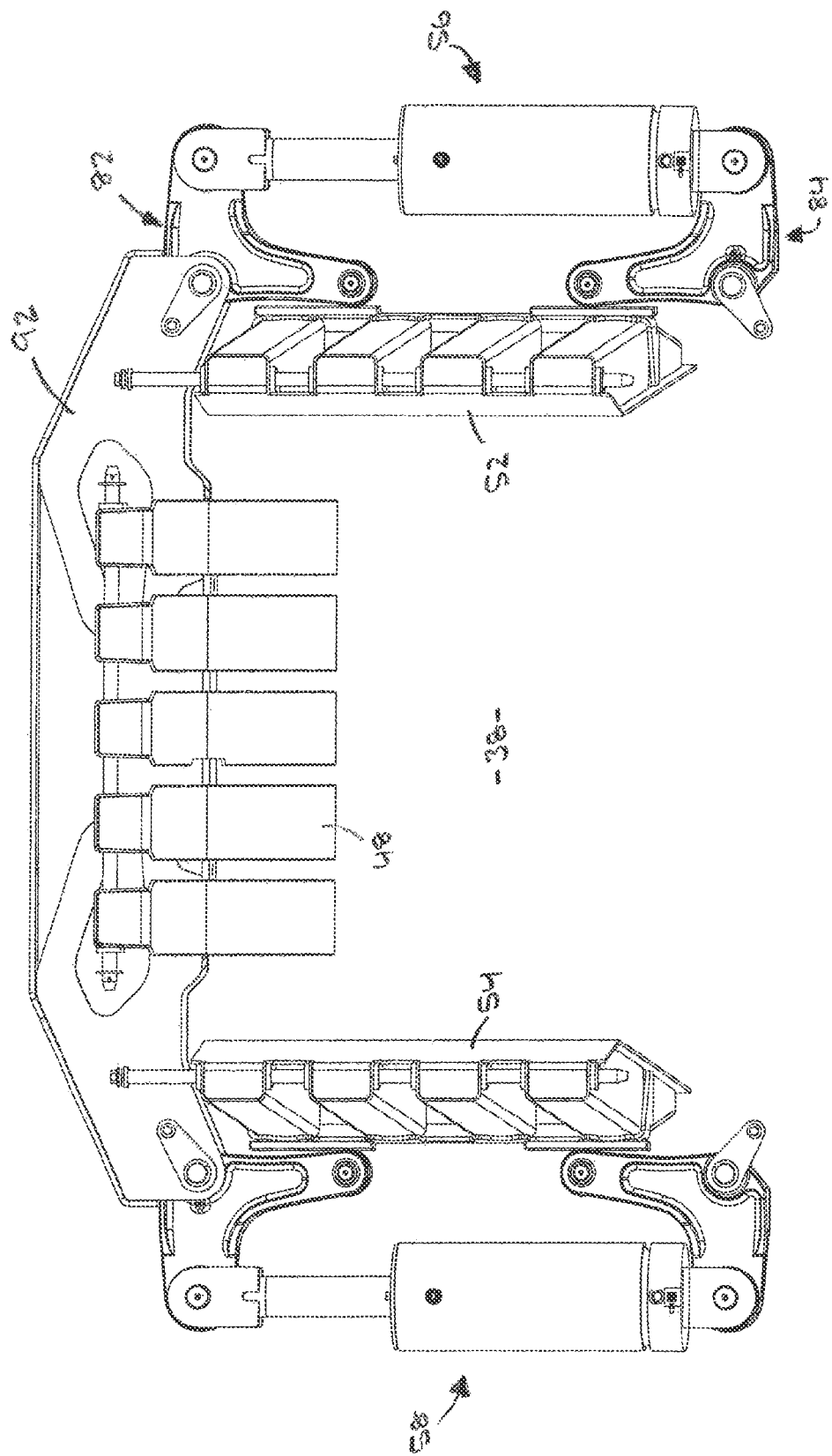
FIG. 10 is a front elevation view of the baling chamber components of FIG. 2.

Broadly characterized, the present invention provides for the improved production of bales that have increased side-to-side uniformity and are therefore easier to secure, handle, and stack, while decreasing potentially uneven stresses on baling chamber components. Referring to FIG. 1, an embodiment of the baling system 10 is operable to receive loose crop material 12, form it into a charge 14, and compress the charge 14 into a growing bale 16 to produce a finished bale 18. The baling system 10 may broadly comprise a tractor 20 and a baler 22. The tractor 20 may include a cab 24 wherein the operator of the baler 22 may be located; an electronic display 26 operable to display information to and receive input from the operator; an engine 28 operable to move the tractor 20; and a power take-off (PTO) 30 operable to transfer mechanical power from the engine 28 to the baler 22 or other connected machinery. The baler 22 may broadly comprise a frame 32 mechanically coupled with the tractor 20; a loose crop material receiving component 34; a reciprocating plunger 36; and a baling chamber 38. In regard to some aspects of the present invention, the baling system 10 may include just the baler, such that the tractor 10 is wholly omitted.

The loose crop material receiving component 34 may include an arbor component operable to pick up the loose crop material 12 from the ground, a cutter component operable to cut the collected loose crop material 12, and a feeder component operable to feed the loose crop material 12 into a stuffer chute 44 where it is formed into the charge 14 and fed into the baling chamber 38. The plunger 36 is operable to compress the charge 14 into the growing bale 16 by moving within the baling chamber 38 in a reciprocating manner. More specifically, the plunger 36 repeatedly extends into the baling chamber 38 to compress the charge 14 already present therein, and retracts to allow a subsequent charge to enter via the stuffer chute 44.

Referring also to FIGS. 2-9, the baling chamber 38 may be operable to receive the charge 14 from the stuffer chute 44, to contain the charge 14 as it is compressed into the growing bale 16 by the reciprocating plunger 36, and to at least partly define the shape and dimensions of the growing and finished bales 16,18. The baling chamber 38 is preferably defined by upper and lower surfaces 48,50, left and right doors 52,54, and left and right tension cylinders 56,58. The upper surface 48 may be fixedly or moveably mounted, may comprise a single surface or a plurality of spaced apart surfaces (e.g., slats), and may be angled downwardly in the direction of an exit opening of the baling chamber 38 (which is opposite the plunger 36) so as to progressively reduce the top-to-bottom dimension of the baling chamber 38 such that as the growing and finished bales 16,18 are pushed further into the baling chamber 38 the upper and lower surfaces 48,50 act to compact the constituent crop material and thereby increase the densities of the growing and finished bales 16,18 as the plunger 36 pushes the bales 16,18 through the chamber 38. The lower surface 50 may also be fixedly or moveable mounted, and may also comprise a single surface or a plurality of spaced-apart surfaces. The left and right doors 52,54 may be moveably mounted so as to allow for shaping and managing the density of the bales 16,18. Thus, the surfaces 48,50 and the doors 52,54 cooperate to substantially define the baling chamber 38 and to contain and form the growing and finished bales 16,18.

The left and right tension cylinders 56,58 are configured to exert forces on the left and right doors 52,54 in order to facilitate compressing and forming the bales 16,18. The tension cylinders 56,58 may be hydraulically, mechanically, or otherwise extendable and retractable. In particular, the left and right doors 52,54 may be angularly oriented so as progressively reduce the side-to-side dimension of the baling chamber 38 such that as the bales 16,18 are pushed further into the baling chamber 36 the left and right doors 52,54 act to further compact the constituent crop material and thereby increase the density of the bales 16,18 in the manner of an extrusion process. The left and right tension cylinders 56,58 extend and contract to maintain a substantially constant force on the left and right doors 52,54 and therefore the bales 16,18.

Each of the left and right doors 52,54 may present a forward end 62 which is pivotably mounted, and a rearward end 64 which is relatively free to move. The forward end 62 may be pivotably mounted using, e.g., a hinge, rod, or similar mechanism 66. Each of the left and right tension cylinders 56,58 may be mounted so as to act on an area of its respective door 52,54 that is closer to the rearward end 64 of the door 52,54 than to the forward end 62. Thus, as the left and right tension cylinders 56,58 extend and contract to maintain the force on their respective doors 52,54, the forward ends 62 of the doors 52,54 pivot about their mountings 66 and the rearward ends 64 move inwardly or outwardly (relative to the baling chamber 38).

Each of the left and right tension cylinders 56,58 may include a barrel 70 having upper and lower ends 72,74, and a rod 76 having upper and lower ends 78,80. The rod 76 may be hydraulically, mechanically, or otherwise extensible from and retractable into the barrel 70 in order to maintain the force on the doors 52,54. The force may be transmitted to the left and right doors 52,54 through upper and lower lever arms 82,84. Each of the upper and lower lever arms 82,84 may be substantially "L" or otherwise angularly shaped and present an apex 86, a first leg 88, and a second leg 90. The apex 86 of each lever arm 82,84 may be pivotably mounted to fixed structural components 92 of the baler 22. The first leg 88 may be pivotably coupled with the upper end 88 of the rod 76 or the tension cylinder 56,58. The second leg 90 may be relatively free to move against an external surface of the door 52,54. Thus, in operation, when the tension cylinder 56,58 extends, the upper and lower lever 82,84 arms pivot about their apexes 86 such that their second legs 90 move away from the door 52,54 and thereby decrease the force on the door 52,54 and on the bales 16,18 inside the baling chamber 38. When the tension cylinder 56,58 retracts, the upper and lower lever arms 82,84 pivot about their apexes 86 such that their second legs 90 move toward the door 52,54 and thereby increase the forces on the door 52,54 and the bales 16,18 inside the baling chamber 38.

When the left and right tension cylinders 56,58 are operating at equal lengths the bales 16,18 will be produced substantially straight, but when the tension cylinders 56,58 are operating at unequal lengths, even by a relatively small amount, crop material is being added to the growing bale 16 on the side of the shorter (or less-extended) tension cylinder 56,58, which can result in the bales 16,18 having significant side-to-side curvature. This is especially true for certain crops such as small grain straws and dry grass.

Left and right transducers 100,102 measure the length of their respective tension cylinders 56,58, and communicate those lengths to an ECU 104. The transducers 100,102 may be located external or internal to the tension cylinders 56,58, linear or rotational in nature, monitor the lengths of the tension cylinders 56,58 periodically (e.g., following compaction of each new charge) or substantially continuously, and communicate in a wired or wireless manner with the ECU 104. In one implementation, for example, the transducers 100,102 may be commercial linear transducers incorporated into the barrels 70 of the tension cylinders 56,58, may monitor the length of the cylinder 56,58 substantially continuously, and may be in wired communication with the ECU 104.

The ECU 104 may be operable to receive the length measurements from the left and right transducers 100,102, and communicate those measurements, or at least a relative difference between the lengths, to the electronic display 26 in the cab 24 of the tractor 20 for consideration by the tractor's operator in determining how to steer the baling system 10. Basing feedback on the lengths of the cylinders rather than (as in the prior art) on the loads on the cylinders provides more reliable information regarding the shape of the bale 16,18 as a function of the actual side-to-side distribution of crop material in the baling chamber 38. The electronic display 26 may present a graphical chart of the lengths or at least the relative difference between the lengths as they occur in real-time. This allows the operator to make directional corrections in the movement of the baling system 10 over the windrows in order to produce straighter and otherwise more uniform bales even in adverse crop conditions. The ECU 104 or other electronic devices receiving input from the ECU 104 may be further configured to substantially automatically steer the baling system 10 via a steering system 106 in response to feedback from the transducers 100,102 in order to substantially automatically produce straighter and otherwise more uniform bales 16,18 with less operator input.

Figure 11:
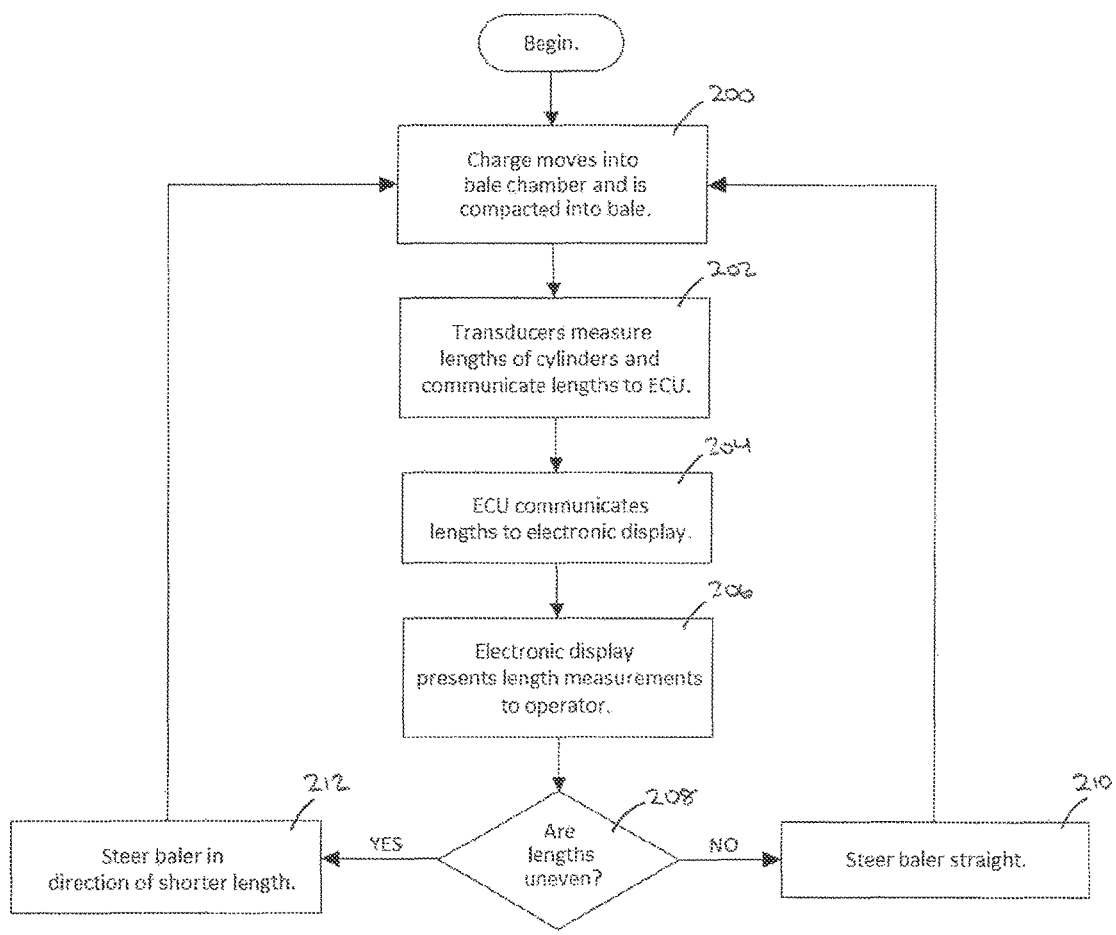
FIG. 11 is a flowchart of steps involved in operation of the baling system of FIG. 1.

Referring to FIG. 11, the baling system 10 may function substantially as follows with regard to this aspect of producing the bales 16,18. Throughout this procedure, the operator of the tractor 20 is able to remain in or on the tractor 20. The charge 14 moves through the stuffer chute 44 and into the baling chamber 38, and is compacted by the reciprocating plunger 36 into the growing bale 16, as shown in step 200. The transducers 100,102 measure the lengths of the left and right tension cylinders 56,58, and communicate the lengths to the ECU 104, as shown in step 202. The ECU 104 communicates the lengths or at least a relative difference between the lengths to the electronic display 26 in the cab 24 of the tractor 20, as shown in step 204. The electronic display 26 presents the length measurements to the operator of the baling system 10 for consideration, as shown in step 206. The operator determines whether the tension cylinder lengths are significantly uneven, as shown in step 208. If the lengths are not uneven, the operator steers the baling system 10 straight (relative to the windrow), as shown in step 210. If the lengths are uneven, the operator steers the baling system 10 in the direction of the shorter tension cylinder, as shown in step 212, so that more crop material is picked up on the side with the shorter cylinder length so that a subsequent charge introduces more crop material to that side of the baling chamber 38 and thereby produces a more even distribution of crop material in the growing bale 16, which minimizes curvature of the bale 16. Steps 200-212 are then repeated throughout the bale production process.

Figure 12:
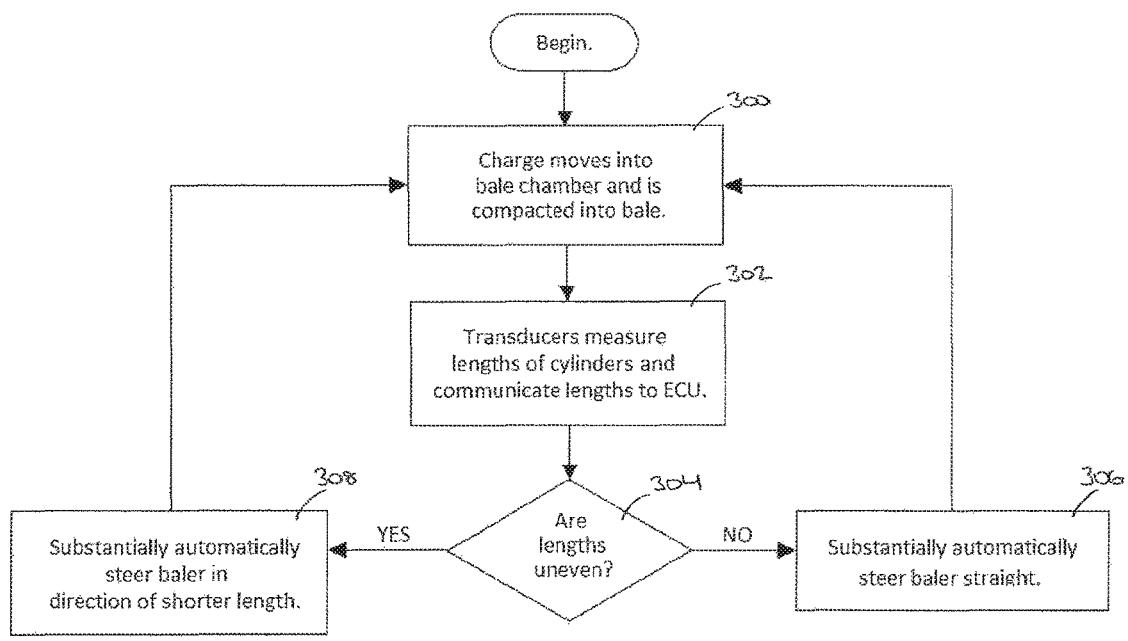
FIG. 12 is a flowchart of steps involved in alternative operation of the baling system of FIG. 1.

Referring to FIG. 12, the baling system 10 may alternatively function substantially as above except as follows. The charge 14 moves through the stuffer chute 44 and into the baling chamber 38, and is compacted by the reciprocating plunger 36 into the growing bale 16, as shown in step 300. The transducers 100,102 measure the lengths of the left and right tension cylinders 56,58, and communicate the lengths to the ECU 104, as shown in step 302. The ECU 104 then determines whether the tension cylinder lengths are uneven, as shown in step 304. If the lengths are not even, then the ECU 104 or another system which receives input from the ECU 104 substantially automatically causes the steering system 106 to steer the baling system 10 straight, as shown in step 306. If the tension cylinder lengths are uneven, then the ECU 104 or another system which receives input from the ECU 104 substantially automatically causes the steering system 106 to steer the baler 22 in the direction of the shorter tension cylinder, as shown in step 308, so that more crop material is picked up on the side with the shorter cylinder length so that a subsequent charge introduces more crop material to that side of the baling chamber 38 and thereby produces a more even distribution of crop material in the growing bale 16, which minimizes curvature of the bale 16. Steps 300-308 are then repeated throughout the bale production process.

Thus, the present invention provides advantages over the prior art, including that it provides for the improved production of bales 16,18 that have increased side-to-side uniformity and are therefore easier to secure, handle, and stack, while decreasing potentially uneven stresses on baling chamber components such as the plunger 36.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

The invention claimed is:

1. A baling system configured to move over, collect, and bale a crop material, wherein a baling chamber receives a charge of crop material and contains a growing bale of crop material, and a plunger moves within the baling chamber in a reciprocating manner so as to compact the charge of crop material into the growing bale of crop material, the baling system comprising:
    left and right moveable doors which at least partly define a shape and dimension of the baling chamber and a shape and dimension of the growing bale of crop material;
    left and right tension cylinders configured to extend and retract in order to apply a force to the left and right moveable doors as the charge of crop material is compacted into the growing bale of crop material;
    left and right transducers configured to measure a first length of the left tension cylinder and a second length of the right tension cylinder; and
    an electronic control unit configured to receive the first and second lengths from the left and right transducers, and to communicate at least a relative difference between the first and second lengths for use in steering the baling system;
    wherein the first and second lengths being equal indicates the growing bale of crop material is substantially straight and the baling system should be steered straight, and
    wherein the first and second lengths being unequal indicates the growing bale is developing a curvature and the baling system should be steered in a direction of the left or right tension cylinder having a shorter length.

2. The baling system as set forth in claim 1, wherein the left and right transducers are located external to the left and right tension cylinders.

3. The baling system as set forth in claim 1, wherein the left and right transducers are located internal to the left and right tension cylinders.

4. The baling system as set forth in claim 1, wherein the left and right transducers measure the first and second lengths periodically.

5. The baling system as set forth in claim 1, wherein the left and right transducers measure the first and second lengths continuously.

6. The baling system as set forth in claim 1, further including an electronic display in communication with the electronic control unit and configured to receive the first and second lengths from the electronic control unit, and to display the at least the relative difference between the first and second lengths for consideration by an operator of the baling system when steering the baling system.

7. The baling system as set forth in claim 6, wherein the electronic display displays the at least the relative difference between the first and second lengths in graphical form.

8. The baling system as set forth in claim 1, further including a steering system for substantially automatically steering the baling system based on the at least the relative difference between the first and second lengths.

9. The baling system as set forth in claim 1, further including an upper lever arm and a lower lever arm extending between each of the left and right tension cylinders and the respective left and right moveable doors and configured to transmit the force to the respective left and right moveable doors.

10. The baling system as set forth in claim 1 wherein the left and right tension cylinders apply a constant force to the left and right moveable doors as the charge of crop material is compacted into the growing bale of crop material.

11. The baling system as set forth in claim 1 wherein left and right tension cylinders are hydraulic tension cylinders.

12. The baling system as set forth in claim 1 further comprising upper and lower surfaces, wherein the the upper and lower surfaces and the left and right moveable doors substantially define a shape and dimension of the baling chamber and a shape and dimension of the growing bale of crop material.

* * * * *